US007002450B2

(12) United States Patent
Bartz

(10) Patent No.: US 7,002,450 B2
(45) Date of Patent: *Feb. 21, 2006

(54) METHOD FOR AUTHENTICATING A SPARE KEY FOR USING A VEHICLE

(75) Inventor: Ruediger Bartz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/879,123

(22) Filed: Jun. 30, 2004

(65) Prior Publication Data

US 2005/0024182 A1    Feb. 3, 2005

Related U.S. Application Data

(63) Continuation of application No. 09/484,418, filed on Jan. 18, 2000, now Pat. No. 6,847,286.

(30) Foreign Application Priority Data

Jan. 15, 1999   (DE) ................. 199 01 277

(51) Int. Cl.
  *H04Q 9/00*       (2006.01)
  *G08C 19/00*      (2006.01)
  *G05B 19/00*      (2006.01)
  *H04L 9/00*       (2006.01)

(52) U.S. Cl. ............ 340/5.8; 340/5.81; 340/5.82; 340/5.83; 340/5.84; 340/5.85; 340/5.23; 380/262

(58) Field of Classification Search ......... 340/5.8, 340/5.81, 5.82, 5.83, 5.84, 5.85, 5.23, 5.26, 340/5.72, 5.21; 380/262, 277

See application file for complete search history.

(56) References Cited

U.S. PATENT DOCUMENTS

| | | | | |
|---|---|---|---|---|
| 5,838,251 A | * | 11/1998 | Brinkmeyer et al. | 340/5.22 |
| 6,329,901 B1 | * | 12/2001 | Brinkmeyer et al. | 340/5.4 |
| 6,337,912 B1 | * | 1/2002 | Buhr et al. | 380/279 |
| 6,374,354 B1 | * | 4/2002 | Walmsley et al. | 713/167 |
| 6,847,286 B1 | * | 1/2005 | Bartz | 340/5.23 |

* cited by examiner

*Primary Examiner*—Michael Horabik
*Assistant Examiner*—Scott Au
(74) *Attorney, Agent, or Firm*—Crowell & Moring LLP

(57) ABSTRACT

In a method for authenticating a spare key for use with a vehicle in the absence of the regular key, the spare key is provided with an identification number that is transmitted to, and checked by, a central station. The spare key is authenticated by an authorization signal sent from the central station to the vehicle.

11 Claims, 1 Drawing Sheet

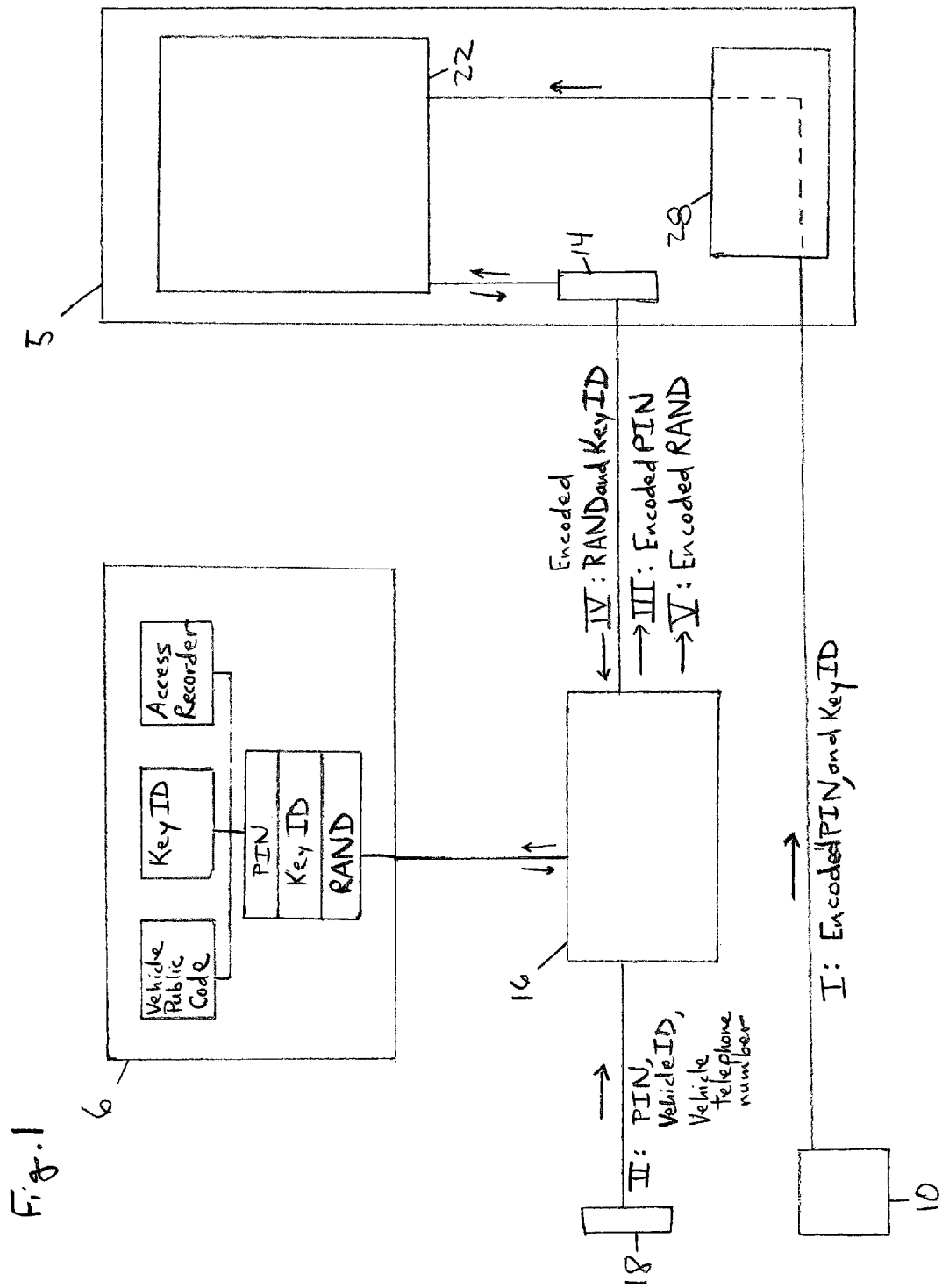

METHOD FOR AUTHENTICATING A SPARE KEY FOR USING A VEHICLE

BACKGROUND AND SUMMARY OF THE INVENTION

This application claims the priority of German Application No. 199 01 277.6, filed Jan. 15, 1999, the disclosure of which is expressly incorporated by reference herein.

The invention relates to a method for authenticating a spare vehicle key for use with a vehicle.

A method of this type is known from European Patent document EP 0 7.88 946 A. In this reference, with the aid of a separate programming unit located outside the vehicle, data specific to a part of the vehicle are retrieved from a central station, transmitted from the central station to the programming unit, and transferred from the latter to the vehicle. The data are then decoded in the vehicle. Although double coding is used some of the time, problems may arise with the known method if the separate programming unit is misused.

Overall, it should be noted that the general trend to increase protection against theft and break-ins runs counter to the customer service requirement of being able to open and move a vehicle when the original key is not present, for example if the original key has been lost or inadvertently locked inside the vehicle. The problem becomes even more acute when burglar-proof glass is used.

The goal of the invention is therefore to create a method of the type referred to above that is easy to perform and use, as well as being protected against misuse.

The invention achieves this goal by providing a method for authenticating a spare key to be used in a vehicle in the absence of the regular key. The spare key is provided with an identification number that is transmitted to, and checked by, a central station. The spare key is authenticated by an authorization signal sent by the central station to the vehicle.

The essential point of the invention is authentication of the spare key by the central station. Since the identification number of the spare key is transmitted to, and checked by, the central station, obvious misuse of a spare key that has been lost for example, as soon as this fact is communicated to the central station, is recognized and transmission of the authorization signal from the central station to the vehicle is prevented.

Advantageous embodiments of the invention are explained in greater detail in the description of the method based on the figures.

Advantageously, at least some of the data transmissions, such as from the spare key to the central station or from the central station to the vehicle are encoded. In particular, the data transmissions are encoded with a random number. In a particular preferred embodiment, bidirectional data traffic occurs wherein the data transmission takes place in one direction followed by transmission of a confirmation signal in an opposite direction. Further advantageously, the bidirectional data traffic in the one direction takes place based on a public key and the decoding at the central station takes place based on private key.

In a particularly advantageous embodiment, the transmission of the spare key identification number to the central station is performed by the vehicle itself, to which the spare key identification number was previously transmitted.

Also advantageously, data transmission can take place via telephony.

In another advantageous embodiment, before the actual data transmission occurs, a receiver is activated by the spare key.

Other objects, advantages and novel features of the present invention will become apparent from the following detailed description of the invention when considered in conjunction with the accompanying drawings.

BRIEF DESCRIPTION OF THE DRAWINGS

The single FIGURE is a block diagram showing the operative switchpoints and transmission paths of the method according to the present invention.

DETAILED DESCRIPTION OF THE DRAWINGS

The method described here provides the possibility of opening and operating a vehicle 5 with the aid of a universally applicable spare key without impairing the effectiveness of theft protection. When the spare key is authenticated by a central station using the car phone and a central database 6, a temporary authorization at least to open the vehicle using the spare key is granted.

The universally applicable spare key 10 is called a VK key below. Other operating points in the context of the method are the central database 6 (called VK database), a car phone present in the vehicle 14, a base interface telephone 16 (called BIT interface), and a cellular telephone of a customer service representative who brings the spare key into use 18. It is also important to use preferably asynchronous algorithms for telephone calls. This makes it unnecessary to ensure that telephone calls are not being tapped. An "asynchronous algorithm" is understood to be an encoding method that in one direction operates with a public encoding algorithm (public key) and for decoding operates with a secret encoding algorithm (secret "private" key).

The evaluation of the signals arriving at the vehicle is preferably effected by the CAS (car access system) control unit 22 that has a ring memory in which the successful VK key authentications are stored and any attempts at manipulation are stored in an attack memory.

The entire process of opening the vehicle with the spare key takes place in five steps, I through V as described below and indicated in the FIGURE.

I) By pressing a command key on the VK key, the spare key 10 generates a random number PIN which is decoded and, together with an individual recognition of the spare key VK_KEY_ID is transmitted to the vehicle with a non-secret (=public) code. The radio receiver 28 of the vehicle receives this radio-transmitted encoded signal Krypt_fl (VK_KEY_ID, PIN) and the random number PIN and sends it to the CAS 22, where the recognition of the spare key VK-KEY-ID is decoded based on recognition of the random number PIN.

II) The service technician transmits the following data-, preferably using his cellular telephone 18, to the VK database 6:

random number PIN, and the telephone number and chassis number of the vehicle. With telephone transmission, coding is unnecessary.

Using the chassis number, the VK database 6 finds the corresponding public key of the vehicle (P-CODE-FZG) and uses it to encode the random number PIN.

III) The car phone 14 is dialed from the VK database and the encoded random number PIN is transmitted, received by the car phone, and forwarded to the CAS control unit 22.

The CAS has a secret decoding algorithm secret key (S-CODE-Vehicle) which enables it to regenerate the random number PIN without actually knowing this PIN. The PIN is then compared with the PIN received in step I.

IV) If the two PINs are identical, the CAS 22 generates its own random number RAND. RAND and the recognition VK_KEY-ID of the spare key transmitted thereto in step I are each encoded with a public key P-CODE-VK and transmitted to the VK database 6 via the car phone 14. At the VK database, using the secret key S-CODE-VK, the random number RAND and the VK key identifier VK-KEY-ID are regenerated and checked to see whether the VK key identifier VK_KEY-ID is assigned to a valid spare key. Separate knowledge of the random number RAND is not necessary for this regeneration.

V) If the VK key identifier is valid, the random number RAND in response is encoded with a public key P-CODE-Vehicle and transmitted to the CAS 22 in the vehicle 5. The vehicle is able to regenerate the random number RAND with its secret key S-CODE-Vehicle and compare it with the key in its memory. If the two are identical, this is interpreted as validation of the spare key VK_Key and the commands issued with the VK_Key are executed.

It should be understood that the structure and operation of the various components used in the system to perform the method according to the present invention are well known by those of skill in the art. As such, they have not been described in detail here, but rather only the inventive method acts for authenticating the spare vehicle key to be used in the vehicle in the absence of the regular key.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authenticating a spare vehicle key to be used with a vehicle in the absence of a regular key, the method comprising the acts of:

providing the spare vehicle key with an identification number;

transmitting said identification number to the vehicle and to a central station from a source other than from the vehicle;

transmitting said identification number from the vehicle to the central station checking the transmitted identification number by the central station, wherein the central station compares the identification number transmitted from the source other than the vehicle with the identification number transmitted from the vehicle; and authenticating the spare vehicle key and sending an authorization signal from the central station directly to the vehicle.

2. The method according to claim 1, wherein at least one data transmission by and between the spare vehicle key, central station and vehicle is encoded.

3. The method according to claim 2, wherein said data transmission occurs in one direction followed by transmission of a confirmation signal in an opposite direction.

4. The method according to claim 3, wherein bidirectional data traffic in one direction takes place based on a public key and decoding at the central station takes place based on a private key.

5. The method according to claim 1, wherein the transmitting acts are performed using telephony.

6. The method according to claim 2, wherein the transmitting acts are performed using telephony.

7. The method according to claim 3, wherein the transmitting acts are performed using telephony.

8. The method according to claim 4, wherein the transmitting acts are performed using telephony.

9. The method according to claim 1, wherein said transmissions are encoded with a random number.

10. The method according to claim 2, wherein said transmissions are encoded with a random number.

11. The method according to claim 1, wherein before an actual data transmission, a radio receiver in the vehicle is activated by the spare vehicle key.

* * * * *